(12) United States Patent
Brand

(10) Patent No.: US 8,400,270 B2
(45) Date of Patent: Mar. 19, 2013

(54) SYSTEMS AND METHODS FOR DETERMINING AN OPERATING STATE USING RFID

(75) Inventor: John William Brand, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 939 days.

(21) Appl. No.: 12/048,403

(22) Filed: Mar. 14, 2008

(65) Prior Publication Data

US 2009/0231097 A1    Sep. 17, 2009

(51) Int. Cl.
| | |
|---|---|
| H04Q 5/22 | (2006.01) |
| G08B 13/14 | (2006.01) |
| G08B 1/08 | (2006.01) |
| G08B 23/00 | (2006.01) |
| G06K 7/08 | (2006.01) |
| G06K 19/06 | (2006.01) |
| H04B 1/06 | (2006.01) |

(52) U.S. Cl. ............... 340/10.1; 340/572.1; 340/572.4; 340/572.8; 340/539.13; 340/500; 235/451; 235/492; 455/344

(58) Field of Classification Search ............ 340/572.1, 340/10.1, 10.3, 572.8, 572.4, 572.7, 573.1, 340/539.13, 571, 686.1, 3.1, 5.2, 5.92, 825.36, 340/825.49; 235/492, 494, 488, 375, 487, 235/462.43; 428/32.1, 448; 400/611, 613
See application file for complete search history.

(56) References Cited

U.S. PATENT DOCUMENTS

| | | | |
|---|---|---|---|
| 3,090,042 A | 5/1963 | Kleist et al. | |
| 3,713,148 A | 1/1973 | Cardullo et al. | |
| 4,786,907 A | 11/1988 | Koelle | |
| 4,912,471 A | 3/1990 | Tyburski et al. | |
| 5,132,687 A | 7/1992 | Baldwin et al. | |
| 5,963,134 A | 10/1999 | Bowers et al. | |
| 6,078,251 A | 6/2000 | Landt et al. | |
| 6,175,729 B1 * | 1/2001 | He et al. ................. | 455/344 |
| 6,373,389 B1 * | 4/2002 | Przygoda et al. ......... | 340/572.4 |
| 6,377,888 B1 | 4/2002 | Olch | |
| 6,646,555 B1 * | 11/2003 | Forster et al. ............ | 340/572.8 |
| 6,747,560 B2 | 6/2004 | Stevens, III | |
| 7,187,293 B2 * | 3/2007 | White et al. ............. | 340/572.8 |
| 7,307,523 B2 * | 12/2007 | Kister et al. ............ | 340/539.13 |
| 7,408,456 B2 * | 8/2008 | Whitesmith et al. ....... | 340/500 |
| 7,737,849 B2 * | 6/2010 | Hwang et al. ............ | 340/572.1 |
| 7,760,095 B2 * | 7/2010 | Murrah .................. | 340/572.1 |
| 7,800,504 B2 * | 9/2010 | Teeter .................. | 340/572.8 |
| 2007/0057795 A1 | 3/2007 | Kawai et al. | |
| 2007/0221730 A1 * | 9/2007 | McReynolds et al. ....... | 235/451 |

* cited by examiner

*Primary Examiner* — Jennifer Mehmood
*Assistant Examiner* — Mirza Alam
(74) *Attorney, Agent, or Firm* — GE Global Patent Operation; John A. Kramer

(57) ABSTRACT

Systems and methods for determining a binary status of a device are provided. A method for detecting an operating status of a device using a radio frequency identification (RFID) tag is provided. The method includes coupling a first portion of the RFID tag to a first portion of the device and coupling a second portion of the RFID tag to a second portion of the device, wherein the first portion of the device is moveable with respect to the second portion of the device, changing a position of the first portion of the device with respect to a position of the second portion of the device, detecting the change in position of the first device portion based on the movement of the first RFID tag portion, wherein the movement causes a change in a status of an RFID signal emitted by the RFID tag, and determining the status of the device based on the change in the RFID signal status.

28 Claims, 3 Drawing Sheets

SYSTEMS AND METHODS FOR DETERMINING AN OPERATING STATE USING RFID

BACKGROUND OF THE INVENTION

The field of the invention relates generally to detection of a binary state of a device and, more specifically, to systems and methods for determining a remote, non-powered verification of a binary state of a device.

At least some known systems read binary states of devices, such as an on-off state, an open-closed state, a high-low state, and/or a forward-reverse state, using one or more switches, transducers, and/or powered sensors. For example, on a rail freight car, a brake shoe is often applied to the wheel to facilitate decreasing the speed of the freight car as it travels. As the speed of the freight car increases, the temperature of the wheel increases, which may cause the brake to disengage which may result in an accident. Moreover, as the temperature of the wheel increases over time, the brake shoe may fail due to increased wear, thus increasing the operating costs of the railroad.

Accordingly, at least some known railroads monitor the temperature of the wheel and/or brake shoe. More specifically, at least some known monitoring systems employ a "hotbox detector" that uses an infrared detector to measure the temperature of the wheel. Moreover, the monitoring system alerts the train crew if the wheel temperature exceeds a predetermined temperature. However, such systems merely detect a symptom (for example, the increased temperature of the wheel) rather than the cause (for example, the continuously applied brake). As a result, often additional systems are necessary to determine a status of a device being monitored, such as a brake.

BRIEF DESCRIPTION OF THE INVENTION

In one aspect, a method for detecting an operating status of a device using a radio frequency identification (RFID) tag is provided. The method includes coupling a first portion of the RFID tag to a first portion of the device and coupling a second portion of the RFID tag to a second portion of the device, wherein the first portion of the device is moveable with respect to the second portion of the device. The method also includes changing a position of the first portion of the device with respect to a position of the second portion of the device, detecting the change in position of the first device portion based on the movement of the first RFID tag portion, wherein the movement causes a change in a status of an RFID signal emitted by the RFID tag, and determining the status of the device based on the change in the RFID signal status.

In another aspect, a system for detecting a status of a device including a first portion and a second portion is provided, wherein the first portion of the device is moveable with respect to the second portion of the device. The system includes a radio frequency identification (RFID) tag including a first portion coupled to the first portion of the device and a second portion coupled to the second portion of the device. The system also includes an RFID reader configured to read an RFID signal emitted by the RFID tag and a controller communicatively coupled to the RFID reader. The controller is configured to detect a change in a position of the first portion of the device with respect to a position of the second portion of the device, wherein the change in the position of the first portion of the device causes a change in a status of the RFID signal. The controller is also configured to determine the status of the device based on the change in the RFID signal status, generate a signal representative of the status of the device, and transmit the generated signal to a display device for display to an operator.

In another aspect, a method for detecting movement of a device using a radio frequency identification (RFID) tag. The method includes coupling a first portion of the RFID tag to a first portion of the device and coupling a second portion of the RFID tag to a second portion of the device, wherein the first portion of the device is moveable with respect to the second portion of the device. The method also includes changing a position of the first portion of the device with respect to the second portion of the device by applying at least one of a mechanical force, a hydraulic force, and a pneumatic force to the first portion of the device. The method also includes detecting the change in the position of the first portion of the device based on the first RFID tag portion being moved with respect to the first device portion, wherein the movement causes a change in a status of an RFID signal emitted by the RFID tag, and determining the status of the device based on the change in the RFID signal status.

DETAILED DESCRIPTION OF THE INVENTION

As used herein, the term "controller" may include, but is not limited to including, any host server configured to store parameter data, create and serve web pages, and/or control signals and/or systems. A controller as described herein is intended as exemplary only, and thus is not intended to limit in any way the definition and/or meaning of the term "controller." Furthermore, although the invention is described herein in association with a railroad, it should be understood that the present invention is applicable to other host server systems. Accordingly, practice of the present invention is not limited to controllers configured for use only with railroads.

Moreover, as used herein, the term "railcar" may include any car and/or engine configured for use on a railroad, and may also be called a "locomotive," an "engine," or a "freight car." A railcar as described herein is intended as exemplary only, and is thus not intended to limit in any way the definition and/or meaning of the term "railcar." Furthermore, although the invention is described in association with a railroad, it should be understood that the present invention is applicable to other modes of transportation and, in fact, is applicable to any device and/or apparatus for which a binary status may be sought.

Radio frequency identification (RFID) is an identification method that uses devices such as RFID tags to store data and RFID readers to retrieve and/or read the data stored on the RFID tags. At least some RFID tags include two parts: an integrated circuit for storing and processing data, and an antenna for receiving and transmitting a signal containing the data. As is known, RFID tags may be passive, active, or semi-passive. Passive RFID tags do not require an internal power source and are only active when an RFID reader reads the stored data. Both active and semi-passive RFID tags require a power source. As described herein, the term "RFID tag" refers generally to a passive RFID tag. However, it should be understood by one skilled in the art that the methods and systems described herein may use active, semi-passive RFID tags, and/or any combination of active, semi-passive, and passive RFID tags, rather than only passive RFID tags.

Figure 1:
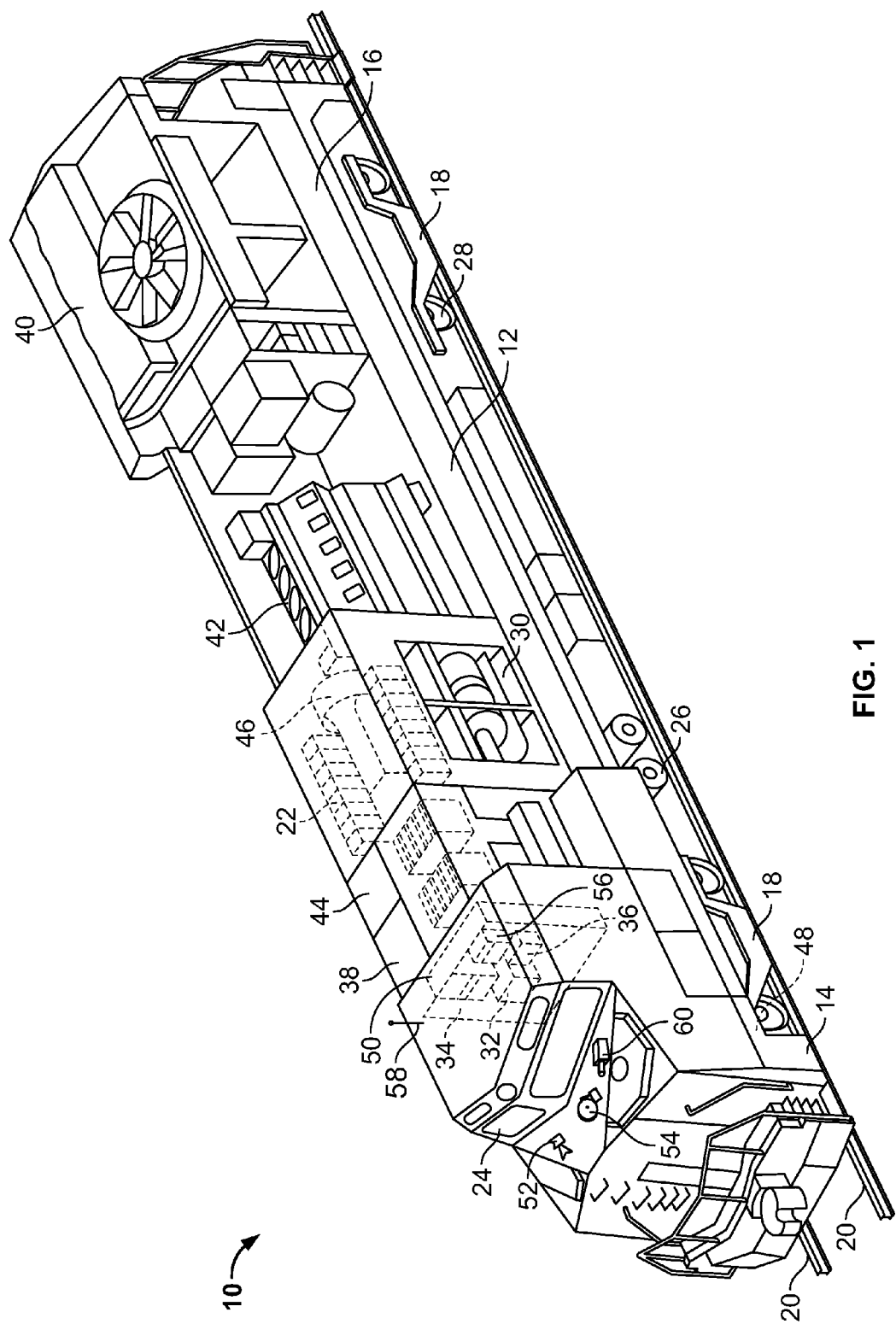
FIG. 1 is a partial cut away view of an exemplary locomotive.

FIG. 1 is a partial cut away view of an exemplary locomotive 10. In the exemplary embodiment, locomotive 10 includes a platform 12 having a first end 14 and an opposite second end 16. Moreover, in the exemplary embodiment, a propulsion system 18, or truck, is coupled to platform 12 for supporting, and propelling platform 12 on a pair of rails 20. An equipment compartment 22 and an operator cab 24 extend from platform 12. An air brake system 26 provides compressed air to locomotive 10 for use in actuating a plurality of air brakes 28 on locomotive 10 and railcars (not shown) behind it. An auxiliary alternator system 30 supplies power to auxiliary equipment, and an intra-consist communications system 32 collects, distributes, and displays consist data across all locomotives 10 included in a consist.

A cab signal system 34 couples the wayside (not shown) to a train control system 36. In particular, in the exemplary embodiment, system 34 receives coded signals from a pair of rails 20 through track receivers (not shown) located on the front and rear of the locomotive 10. Information received conveys the speed limit and operating mode to the operator of the locomotive 10. A distributed power control system 38 enables remote control operation of multiple locomotives 10 coupled in the consist. System 38 also provides for control of tractive power in motoring and braking, as well as air brake control.

An engine cooling system 40 facilitates maintaining an operating temperature of engine 42 and other components below a pre-determined temperature. In addition, system 40 also facilitates minimizing engine thermal cycling by maintaining an optimal engine temperature throughout the operating load range, and thus prevents overheating in tunnels. An equipment ventilation system 44 provides additional cooling to locomotive 10 equipment.

A traction alternator system 46 converts mechanical power to electrical power that is then supplied to propulsion system 18. Propulsion system 18 enables locomotive 10 to move, and in the exemplary embodiment includes at least one traction motor 48 and dynamic braking capability. In particular, in the propulsion system 18 receives power from traction alternator 46, and through traction motors 48 moves locomotive 10. In the exemplary embodiment, locomotive 10 systems are monitored by an on-board monitor (OBM) system 50. OBM system 50 keeps track of incidents occurring in the systems with an incident log.

In the exemplary embodiment, locomotive 10 also includes signaling devices, such as a horn 52 and a bell 54, for signaling to persons located externally to operator cab 24. Horn 52 and bell 54 are used at specific times during transit operations, and such as approaching grades or crossings, to warn of an approaching locomotive. A wireless data preservation programming and management system 56 is included on board locomotive 10. Data preservation programming and management system 56 includes an antenna 58 that transmits and receives signals between locomotive 10 and off-board communication devices through for example, but not limited to a 802.11g link, a satellite link, a UHF, and/or a VHF link. Data preservation programming and management system 56 also includes an imager 60 such as, but not limited to a video camera that is used to acquire image data and/or audio data from an environment external to of locomotive 10.

Figure 2:
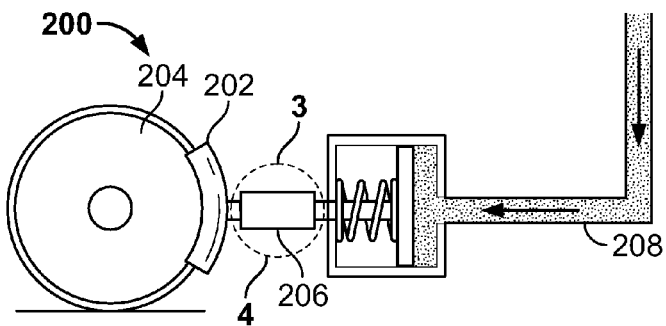
FIG. 2 is a schematic diagram of an exemplary railroad braking system that may be used with the locomotive shown in FIG. 1.
Figure 3:
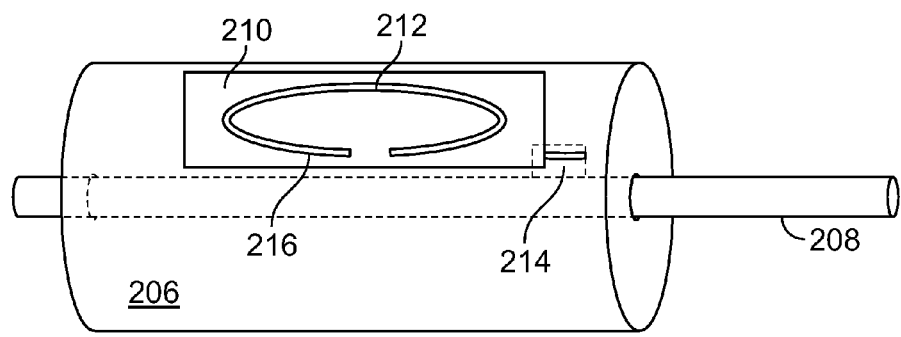
FIG. 3 is an exploded view of a portion of the railroad braking system shown in FIG. 2 illustrating a brake block that has not been applied to a wheel.
Figure 4:
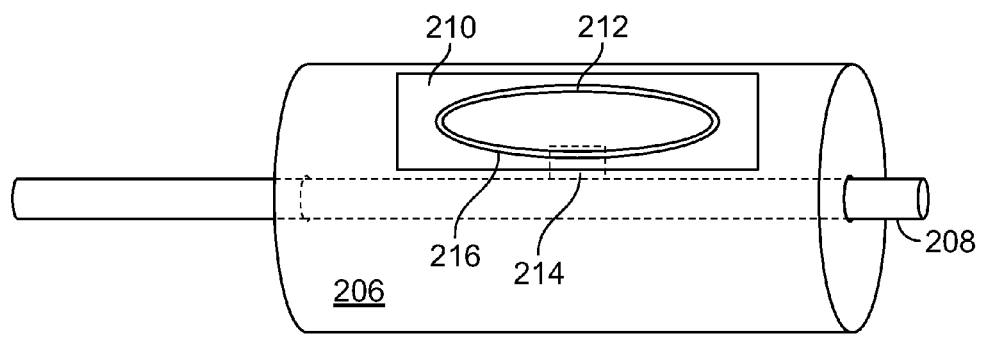
FIG. 4 is an exploded view of a portion of the railroad braking system shown in FIG. 2 illustrating a brake block that has been applied to a wheel.

FIG. 2 is a schematic diagram of an exemplary railroad braking system 200 that may be used with locomotive 10 (shown in FIG. 1) and/or other railcars including those described above. In the exemplary embodiment, braking system 200 includes a brake block 202 that is applied to a wheel 204 to facilitate reducing a rate of rotation of wheel 204 and, therefore, to slow a freight car (not shown) or locomotive 10 associated with wheel 204. FIG. 3 is an exploded view of an RFID enclosure 206 and a piston 208 in a first operating state wherein brake block 202 is not applied to wheel 204. FIG. 4 is an exploded view of enclosure 206 and piston 208 in a second operating state wherein brake block 202 has been applied to wheel 204. In the exemplary embodiment, piston 208 is moved towards brake block 202 through enclosure 206 and past a radio frequency identification (RFID) tag 210 included within enclosure 206. More specifically, in the exemplary embodiment, RFID tag 210 includes an RFID antenna loop 212 that includes a first portion 214 and a second portion 216. First RFID portion 214 is coupled to piston 208, and second RFID portion 216 is coupled to enclosure 206. As piston 208 is translated towards brake block 202, first RFID portion 214 is moved towards second RFID portion 216 such that, when brake block 202 is applied to wheel 204, antenna loop 212 is completed and RFID tag 210 emits an RFID signal.

Figure 5:
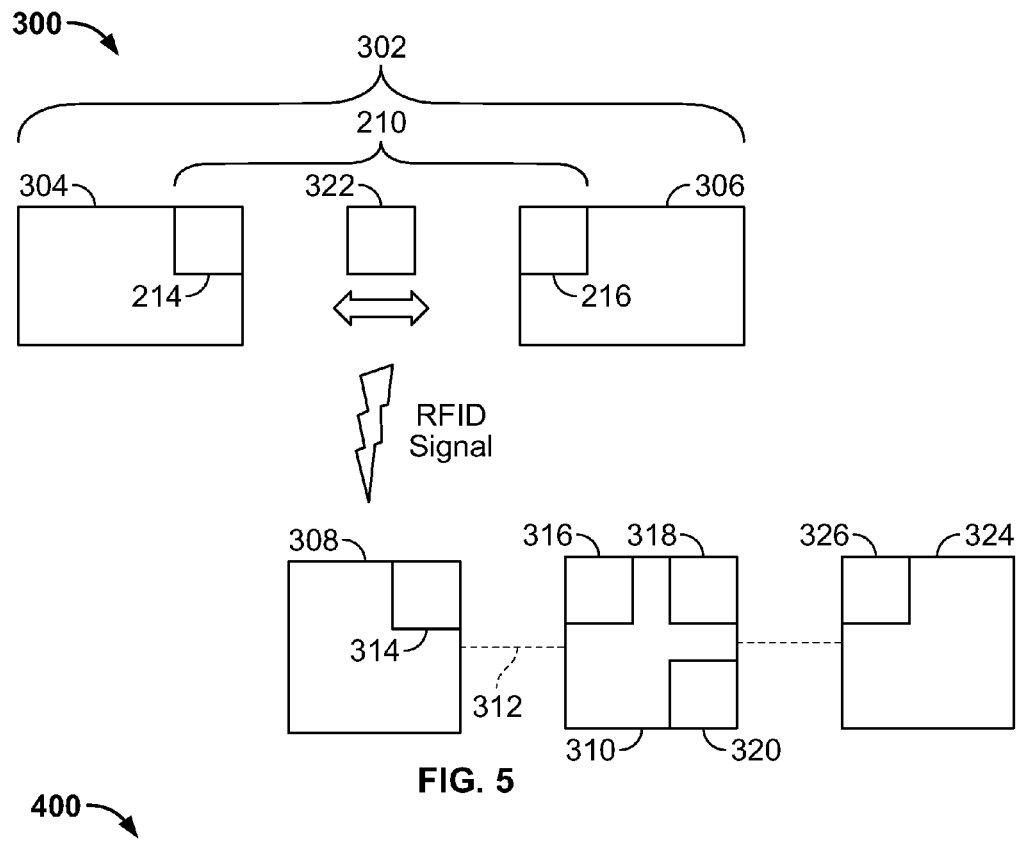
FIG. 5 is a block diagram of an exemplary system for use in detecting a binary status of a device that may be used with the railroad braking system shown in FIG. 2.

FIG. 5 is a block diagram illustrating an exemplary system 300 for detecting a binary status of a device 302, such as a railroad brake block 202 (shown in FIGS. 2-4). Notably, system 300 may be used to detect any binary status of device 302 including, but not limited to including, whether device 302 is open or closed, powered on or powered off, set to a high setting or a low setting, or is engaged in a forward gear or a reverse gear. Moreover, system 300 may be used to detect the status of device 302 remotely, without requiring physical connection or coupling. For example, system 300 may be used to detect the status of a relay within a programmable logic device (PLC) or an automated control module (ACM).

In the exemplary embodiment, system 300 includes a radio frequency identification (RFID) tag, such as RFID tag 210, that includes an RFID antenna loop, such as antenna loop 212 (shown in FIGS. 3 and 4), that has been separated into first portion 214 and second portion 216. First RFID portion 214 is coupled to a first device portion 304, and, similarly, second RFID portion 216 is coupled to a second device portion 306. In the exemplary embodiment, first device portion 304 is moveable with respect to second device portion 306. Accordingly, first RFID portion 214 is moveable with respect to second RFID portion 216. In an alternative embodiment, antenna loop 212 is entirely coupled to second portion 216 and a shielding device (not shown) is coupled to first portion 214 such that, when first portion 214 moves with respect to second portion 216, the shielding device prevents antenna loop 212 from emitting an RFID signal.

System 300 also includes an RFID reader 308 that is positioned a predetermined distance from RFID tag 210 that enables RFID reader 308 to read an RFID signal from RFID tag 210. For example, RFID reader 308 may be located at a wayside, as described above in relation to locomotive 10 (shown in FIG. 1). Alternatively, RFID reader 308 may be located at any point along a path of travel of device 302, such that as device 302 passes RFID reader 308, the RFID signal is read by RFID reader 308.

Moreover, in the exemplary embodiment, system 300 includes a controller 310 that is communicatively coupled to RFID reader 308. In one embodiment, controller 310 and RFID reader 308 may be coupled by a network 312. In an alternative embodiment, RFID reader 308 includes a wireless communication device 314, such as an 802.11 network interface or a Bluetooth interface, for communicating wirelessly with controller 310. As such, in the exemplary embodiment, controller 310 also includes a wireless communication device 316, a memory 318, and a processor 320 that is electrically and communicatively coupled to memory 318 and wireless communication device 316. Processor 310 may be embodied in, for example, a microprocessor, conventional processor, controller, microcontroller, state machine, and/or combination of computing devices, a digital signal processor ("DSP"), an application specific integrated circuit ("ASIC"), a field programmable gate array ("FPGA"), or other programmable logic device, discrete gate or transistor logic, discrete hardware components, and/or any combination thereof that is designed to perform the functions described herein. Moreover, memory 318 may be embodied in a random access memory (RAM), flash memory, read-only memory (ROM), EPROM memory, EEPROM memory, registers, hard disk, a removable disk, a CD-ROM, and/or any other form of storage medium known in the art.

Processor 310 detects a change in a position of first device portion 214 with respect to second device portion 216 The change in the position of first device portion 304 causes a change in a status of the RFID signal emitted by RFID tag 210 and/or detected by RFID reader 308. The change in RFID signal may be triggered by the separation of first device portion 304 and second device portion 306. As such, in one embodiment, system 300 includes a device 322 that separates first device portion 304 and second device portion 306, such as a mechanical device, a hydraulic device, a pneumatic device, or an electrical device such as a relay. Alternatively, the change in RFID signal may be caused as first device portion 304 is joined to second device portion 306. As such, in an alternative embodiment, device 322 may join first device portion 304 and second device portion 306, and may be, for example, a mechanical device, a hydraulic device, a pneumatic device, or an electrical device such as a relay. In another embodiment, device 322 may be configured to both separate and join first device portion 304 and second device portion 306. In a further alternative embodiment, device 322 is a shielding device and is coupled to first device portion 304 and RFID tag 210 is coupled in its entirety to second device portion 306. Device 322 shields RFID tag 210 from RFID reader 308, thereby preventing RFID reader 308 from reading an RFID signal from RFID tag 210.

In the exemplary embodiment, processor 310 determines a binary status of device 302 based on the status change of the RFID signal. Processor 310 then generates a signal that is representative of the status of device 302 and transmits the generated signal to a display 324 that is communicatively coupled to processor 310. In one embodiment, processor 310 is coupled to display 324 via network 312. In an alternative embodiment, display 324 includes a wireless communication device 326. In such an embodiment, display 310 receives the generated signal from wireless communication device 316.

During operation, device 322 controls device 302 such that, in one embodiment, first device portion 304 is separated from second device portion 306. As such, first RFID portion 214 is separated from second RFID portion 216, such that antenna loop 212 cannot emit an RFID signal. During such operations, as device 302 passes RFID reader 308, RFID reader 308 attempts to read the RFID signal, but fails because antenna loop 212 is open and cannot emit the RFID signal. RFID reader 308 transmits the signal status to processor 310, using either wireless communication device 314 or network 312. Processor 310 determines that, because RFID reader 308 was unable to read the RFID signal, first device portion 304 is separated from second device portion 306. Such a separation may correspond to an off state that result when, as shown in FIG. 3, brake block 202 is not applied to wheel 204.

Alternatively, device 322 controls device 302 such that, in another embodiment, first device portion 304 is joined with second device portion 306. As such, first RFID portion 214 is joined to second RFID portion 216, such that antenna loop 212 is closed, enabling antenna loop 212 to emit an RFID signal. As device 302 passes RFID reader 308, RFID reader 308 reads the RFID signal. RFID reader 308 transmits the signal status to processor 310 using either wireless communication device 314 or network 312. During such operations, processor 310 determines that, because RFID reader 308 was able to read the RFID signal, first device portion 304 is joined to second device portion 306. Such a determination may correspond to an on state that may result when, as shown in FIG. 4, brake block 202 is applied to wheel 204.

In another alternative embodiment, device 322 is a shielding device and is moved by device 302 into a position in which device 322 shields an RFID signal of antenna loop 212 from being read by RFID reader 308. As device 302 passes RFID reader 308, RFID reader 308 attempts to read the RFID signal, but fails because antenna loop 212 is shielded and cannot emit the RFID signal beyond device 322. RFID reader 308 transmits the signal status to processor 310, using either wireless communication device 314 or network 312. Processor 310 determines that RFID reader 308 was unable to read the RFID signal, which corresponds to an off state.

Figure 6:
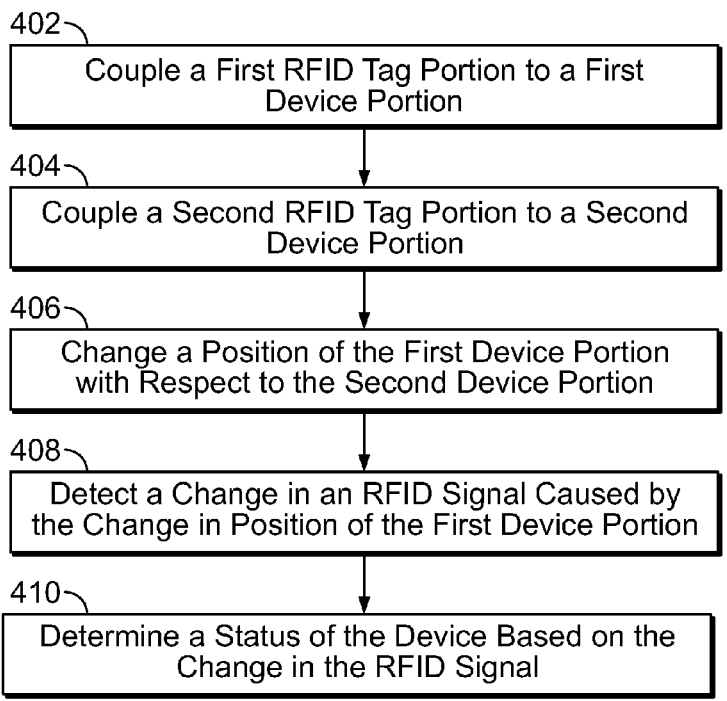
FIG. 6 is a flowchart illustrating an exemplary method for detecting a status of device using the system shown in FIG. 5.

FIG. 6 is a flowchart illustrating an exemplary method 400 for detecting a status of device 302 (shown in FIG. 5) using an RFID tag such as tag 210 (shown in FIGS. 3-5). In the exemplary embodiment, first RFID portion 214 is coupled 402 to first device portion 304, and second RFID portion 216 is coupled 404 to second device portion 306 (each shown in FIG. 5), such that first device portion 304 is moveable with respect to second device portion 306.

In the exemplary embodiment, a position of first device portion 304 is changed 406 with respect to a position of second device portion 306. When first device portion 304 is separated from second device portion 306, first RFID portion 214 is also separated from second RFID portion 216, such that antenna loop 212 (shown in FIGS. 3 and 4) is broken apart. When antenna loop 212 is broken apart, the RFID signal emitted by antenna loop 212 is interrupted such that RFID reader 308 (shown in FIG. 5) is unable to read the RFID signal.

In an alternative embodiment, first device portion 304 may be joined to second device portion 306 using a joining force such as, for example, a mechanical force, a hydraulic force, a pneumatic force, or an electrical force such as used in a relay. When first device portion 304 is joined to second device portion 306, first RFID portion 214 is also joined with second RFID portion 216, such that antenna loop 212 is closed. When antenna loop 212 is closed, the RFID signal emitted by antenna loop 212 is induced such that RFID reader 308 is now able to read the RFID signal.

In another alternative embodiment, a shielding device is coupled to first device portion 304 and RFID tag 210 is coupled to second device portion 306. First device portion 304 may be moved toward second device portion 306 using a joining force such as, for example, a mechanical force, a hydraulic force, a pneumatic force, or an electrical force such as used in a relay. When first device portion 304 is joined to second device portion 306, the shielding device prevents antenna loop 212 from emitting an RFID signal beyond the shielding device. Because antenna loop 212 is shielded, the RFID signal emitted by antenna loop 212 is interrupted such that RFID reader 308 is unable to read the RFID signal.

RFID reader 308 thus detects 408 a change in the RFID signal caused by the change in position of first device portion 304. More specifically, RFID reader 308 attempts to read the RFID signal, but, during such operations, is unable to read the RFID signal because of the separation of antenna loop 212. Alternatively, RFID reader 308 reads the RFID signal emitted by antenna loop 212, wherein the RFID signal was previously unreadable due to the separation of RFID antenna loop 212. RFID reader 308 transmits the RFID signal status to processor 310. Based on the RFID signal status, processor 310 determines 410 the status of device 302. The status of device 302 may then be displayed using display 324 (shown in FIG. 5).

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for detecting a status of a device are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method comprising:
coupling a first antenna portion of an antenna of a radio frequency identification (RFID) tag to a first device portion of a device;
coupling a second antenna portion of the antenna of the RFID tag to a second device portion of the device, wherein the first device portion is moveable with respect to the second device portion;
changing a position of the first device portion with respect to a position of the second device portion to close the conductive antenna by engaging the first antenna portion with the second antenna portion;
detecting a change in the position of the first device portion based on engaging of the first antenna portion with the second antenna portion, wherein engaging of the first antenna portion with the second antenna portion causes a change in a status of an RFID signal emitted by the RFID tag; and
determining a status of the device based on the change in the status of the RFID signal.

2. A method in accordance with claim 1 wherein changing a position of the first device portion with respect to the second device portion comprises moving at least one of the first device portion or the second device portion using at least one of a mechanical force, a hydraulic force, or a pneumatic force.

3. A method in accordance with claim 1 wherein detecting the change in the position of the first device portion comprises detecting an interruption in the RFID signal using an RFID reader, wherein the interruption in the RFID signal is caused by an opening of the antenna of the RFID tag when the first antenna portion of the antenna of the RFID tag is separated from the second antenna portion of the RFID tag.

4. A method in accordance with claim 3 further comprising interrupting the RFID signal by shielding the antenna loop from the RFID reader such that the RFID reader is unable to read the RFID signal.

5. A method in accordance with claim 1 wherein changing the position of the first device portion with respect to the position of the second device portion comprises joining the first device portion and the second device portion using at least one of a mechanical force, a hydraulic force, or a pneumatic force.

6. A method in accordance with claim 1 wherein detecting the change in the position of the first device portion comprises detecting an induced RFID signal from the antenna of the RFID tag using an RFID reader when the first antenna portion of the antenna of the RFID tag is joined with the second antenna portion of the antenna of the RFID tag to close an antenna loop within the RFID tag.

7. A method in accordance with claim 6 further comprising inducing the induced RFID signal by removing a shielding device from the antenna loop such that an RFID reader reads the induced RFID signal.

8. A system comprising:
a radio frequency identification (RFID) tag comprising an antenna divided into a first antenna portion and a second antenna portion, the first antenna portion configured to be coupled to a first device portion of a device and the second antenna portion configured to be coupled to a second device portion of the device;
an RFID reader configured to read an RFID signal emitted by said RFID tag; and
a controller configured to be communicatively coupled to said RFID reader, said controller configured to:
detect a change in a position of the first device portion with respect to a position of the second device portion, wherein the change in the position of the first device portion causes the first antenna portion to engage the second antenna portion to close the antenna and produce a change in a status of the RFID signal emitted by the antenna; and
determine a status of the device based on the change in the status of the RFID signal.

9. A system in accordance with claim 8 further comprising a separator configured to separate the first device portion from the second device portion, said separator using at least one of mechanical power, hydraulic power, or pneumatic power.

10. A system in accordance with claim 8 wherein said controller is further configured to detect the change in the position of the first device portion by detecting an interruption in the RFID signal, wherein the interruption is caused by separation of the first antenna portion from the second antenna portion when the first device portion is moved from the second device portion.

11. A system in accordance with claim 8 wherein the first antenna portion and the second antenna portion define an antenna loop when the first antenna portion is engaged with the second antenna portion, and the antenna loop is broken when the first antenna portion is separated from the second antenna portion.

12. A system in accordance with claim 8 further comprising a joining component for joining the first device portion to the second device portion using at least one of mechanical power, hydraulic power, or pneumatic power.

13. A system in accordance with claim 8 wherein said controller is further configured to detect the change in the position of at least one of the first device portion or the second device portion by detecting an induced RFID signal that is created by joining the first antenna portion to the second antenna portion.

14. A system in accordance with claim 13 wherein the first antenna portion and the second antenna portion define an antenna loop that is closed when the first antenna portion is joined with the second antenna portion.

15. A method comprising:
coupling a first antenna portion of a radio frequency identification (RFID) tag to a first device portion of a device;
coupling a second antenna portion of an RFID tag to a second device portion of the device, wherein the first device portion is moveable with respect to the second device portion;
changing a position of the first device portion with respect to the second device portion;
detecting a change in the position of the first device portion based on movement of the first antenna portion of the RFID tag, wherein the movement couples the first antenna portion and the second antenna portion to cause a change in a status of an RFID signal emitted by the RFID tag; and
determining a status of the device based on the change in the status of the RFID signal.

16. A method in accordance with claim 15 wherein changing the position of the first device portion includes applying a force to the first device portion that causes one of a separation of the first antenna portion from the second antenna portion or a joining of the first antenna portion to the second antenna portion.

17. A method in accordance with claim 15 wherein detecting the change in the position of the first device portion also comprises detecting an interruption in the RFID signal using an RFID reader, wherein the interruption in the RFID signal is caused by breaking an antenna loop formed by engaging the first antenna portion with the second antenna portion within the RFID tag by separating the first antenna portion from the second antenna portion.

18. A method in accordance with claim 17 further comprising interrupting the RFID signal by shielding the antenna loop from the RFID reader such that the RFID reader is unable to read the RFID signal.

19. A method in accordance with claim 15 wherein detecting the change in the position of the first device portion comprises detecting an induced RFID signal using an RFID reader, wherein the RFID signal is induced by joining the first antenna portion to the second antenna portion to close an antenna loop within the RFID tag.

20. A method in accordance with claim 19 further comprising inducing the RFID signal by removing a shielding device from the antenna loop such that the RFID reader reads the RFID signal.

21. A system comprising:
a first portion of an antenna in a radio frequency identification (RFID) tag that is configured to be coupled to a first device; and
a second portion of the antenna in the RFID tag that is configured to be coupled to a second device;
wherein the first portion of the antenna is configured to couple with the second portion of the antenna to close the antenna when the first device moves relative to the second device in a first direction, and the first portion of the antenna is configured to separate from the second portion of the antenna to open the antenna when the first device moves relative to the second device in a different, second direction; and
wherein the antenna that is closed by the first portion of the antenna and the second portion of the antenna emits an RFID signal when interrogated by an RFID reader.

22. The system of claim 21, wherein the antenna does not emit the RFID signal when interrogated by the RFID reader and the first portion of the antenna is separated from the second portion of the antenna.

23. The system of claim 21, wherein the antenna formed by the first portion and the second portion of the antenna is an antenna loop that is closed when the first portion of the antenna couples with the second portion of the antenna and that is opened when the first portion of the antenna separates from the second portion of the antenna.

24. The system of claim 21, wherein the first portion of the antenna is configured to be coupled to a piston of a braking system in a vehicle and the second portion of the antenna is configured to be coupled to an enclosure through which the piston moves relative to the enclosure to apply or release a brake of the braking system.

25. The system of claim 21, further comprising a shielding device configured to move between the antenna and the RFID reader when the first device moves in the second direction in order to prevent at least one of the RFID reader from interrogating the antenna or the RFID reader from receiving the RFID signal from the antenna.

26. A method in accordance with claim 1 wherein changing the position of the first device portion includes moving both the first device portion and the first antenna portion relative to the second device portion and the second antenna portion.

27. A system in accordance with claim 8 wherein the RFID tag includes the first antenna portion configured to be coupled to the first device portion and separate from the second device portion such that movement of the first device portion causes both the first device portion and the first antenna portion to move relative to the second device portion and the second antenna portion.

28. A method in accordance with claim 15 wherein changing the position of the first device portion includes moving both the first device portion and the first antenna portion relative to both the second device portion and the second antenna portion.

* * * * *